United States Patent [19]

Anelli et al.

[11] Patent Number: 4,725,123
[45] Date of Patent: Feb. 16, 1988

[54] HYDROGEN ABSORBING MIXTURE FOR OPTICAL FIBER CABLES AND CABLES CONTAINING SUCH MIXTURE

[75] Inventors: Pietro Anelli, Milan; Gianfranco Colombo, Sesto san Giovanni, both of Italy

[73] Assignee: Societa' Cavi Pirelli S.p.A., Milan, Italy

[21] Appl. No.: 915,736

[22] Filed: Oct. 6, 1986

Related U.S. Application Data

[63] Continuation-in-part of Ser. No. 899,948, Aug. 25, 1986, which is a continuation-in-part of Ser. No. 723,901, Apr. 16, 1985, Ser. No. 798,598, Nov. 15, 1985, Pat. No. 4,688,889, and Ser. No. 846,576, Mar. 31, 1986.

[30] Foreign Application Priority Data

Oct. 8, 1985 [IT] Italy ................. 22390 A/85

[51] Int. Cl.⁴ ................................................ G02B 6/44
[52] U.S. Cl. ................................................. 350/96.23
[58] Field of Search ............... 350/96.23, 96.29, 96.30; 502/159, 401, 402

[56] References Cited

U.S. PATENT DOCUMENTS

| | | | |
|---|---|---|---|
| 4,110,425 | 8/1978 | Bühl et al. ................ | 502/159 X |
| 4,235,748 | 11/1980 | Berchielli et al. .......... | 502/159 X |
| 4,433,063 | 2/1984 | Bernstein et al. .......... | 502/402 |
| 4,688,889 | 8/1987 | Pasini et al. ............... | 350/96.23 |

FOREIGN PATENT DOCUMENTS

| | | | |
|---|---|---|---|
| 2144559 | 3/1985 | United Kingdom ............. | 350/96.23 |
| 2144878 | 3/1985 | United Kingdom ............. | 350/96.23 |

*Primary Examiner*—Eugene R. LaRoche
*Assistant Examiner*—James C. Lee
*Attorney, Agent, or Firm*—Brooks Haidt Haffner & Delahunty

[57] ABSTRACT

Hydrogen absorbing mixtures for protecting optical fibers from damage by hydrogen and optical fiber telecommunication cables containing such a mixture or mixtures. The mixture includes at least one oxide selected from oxides of titanium, vanadium, chromium, manganese, iron, cobalt, nickel, copper, zinc, cerium, tin, lead and wolfram, at least one catalyst selected from among the transition metals, the inorganic and organic compounds of the transition metals and the complexes of the said transition metals, both by themselves as well as supported by inert materials, and an anhydrous salt which, on chemically reacting with water, forms crystalline hydrated compounds which are stable at temperatures up to at least 90° C. The anhydrous salt may be one or more of anhydrous calcium sulfate, anhydrous calcium chloride, anhydrous sodium sulfate and anhydrous copper sulfate. In a cable, the mixture is between the cable sheath and the optical fibers or is incorporated in the sheath if it is made of polymeric material. The mixture may be used alone or dispersed in a filler and may be coated on or incorporated in a component of the cable.

27 Claims, 11 Drawing Figures

HYDROGEN ABSORBING MIXTURE FOR OPTICAL FIBER CABLES AND CABLES CONTAINING SUCH MIXTURE

This application is a continuation-in-part of application Ser. No. 899,948, filed Aug. 25, 1986 and entitled "Optical Fiber Cable with Hydrogen Combining Material Therein", which is a continuation-in-part of application Ser. No. 723,901, filed Apr. 16, 1985 and entitled "Optical Fiber Cable with Hydrogen Combining Layer", of application Ser. No. 798,598, now U.S. Pat. No. 4,668,889, issued Aug. 25, 1987 filed Nov. 15, 1985 and entitled "Hydrogen Fixing Fillers for Optical Fiber Cables and Components and Cables and Components Containing Such Filler", and Ser. No. 846,576, filed Mar. 31, 1986 and entitled "Hydrogen Absorbing Composition for Optical Fiber Cables and Cables Containing Such Composition", all of such applications being assigned to the assignee of the present application.

The present invention relates to an optical fiber, telecommunication cable incorporating a hydrogen-absorbing mixture for protecting the optical fibers from damage caused by hydrogen.

The present invention also relates to a hydrogen-absorbing mixture for optical fiber telecommunication cables for protecting such optical fibers with respect to hydrogen.

It is already known that in an optical fiber cable, hydrogen is formed either through its being developed by the material of the cable components, when the said materials have absorbed it during their manufacture, or else, through the chemical reaction of the traces of water, which are present inside the cable, with the metallic materials of the cable.

Another reason for the presence of hydrogen inside a cable, is the diffusion of the hydrogen inside the cable when the cable is disposed in an ambient where a large amount of hydrogen exists.

It is further known that, whenever the optical fibers of a cable absorb hydrogen, an irreversible attenuation of the signals transmitted by the fibers takes place in the ranges of the wave lengths utilized for telecommunications and hence the cable is no longer satisfactory for use.

For preventing this phenomena, it has already been proposed to introduce into the optical fiber cables, mixtures which are adapted to physically absorb the hydrogen, such as powders of titanium, zirconium, and of palladium which can be supported by an inert material, such as animal, or vegetable carbon powder, or the like.

It has also been proposed to introduce into the optical fiber cables, a mixture of manganese dioxide and of a catalyst adapted to transform hydrogen into water and of physically blocking this latter, for example, by means of a silica gel, so as to prevent said water from coming into contact with the metallic materials of the cable and once again developing hydrogen. Optical fiber cables for telecommunication, containing such substances are, for example, described in U.K. Pat. No. 2,149,935.

All these known optical fiber cables do not guarantee any really effective protection of the optical fibers from hydrogen for the following reason.

Both the substances, such as the powders of titanium, zirconium and palladium which physically absorb the hydrogen, as well as the manganese dioxide which, in the presence or catalysts, reacts with the hydrogen to form water which, although prevented from migrating through the cable remains as such inside the cable and, therefore, such substances are incapable of totally eliminating the hydrogen within a cable and can only reduce its quantity.

This is due to the fact that both of the mechanisms providing the actions, i.e., the physical one for the absorption, as well as the chemical one, are of the reversible type, and as such, they permit an equilibrium wherein all the substances, involved in the mechanisms, coexist. Hence, this inevitably causes traces of hydrogen to still be present in the cable.

From this, it can be concluded that the above-described "known" optical fiber cables are incapable of providing any absolute and efficient protection, with the passage of time, for the optical fibers incorporated in such cables, because the traces of hydrogen, which cannot be eliminated, cause increasing damage to the optical fibers as time passes.

One object of the present invention is to provide optical fiber telecommunication cables wherein the optical fibers are protected, in an efficient manner, from damage which can be caused to them by the hydrogen during the entire period of operation required which, as is known, is on the order of tens of years.

Another object of the present invention is to provide a hydrogen-absorbing mixture for optical fiber telecommunication cables which, once introduced into the cables, provides protection for the optical fibers from damage due to hydrogen in an efficient way with the passage of time.

In accordance with the present invention, there is provided an optical fiber telecommunication cable incorporating a hydrogen-absorbing mixture and comprising a sheath enclosing at least one optical fiber characterized by the fact that said mixture is based on at least one oxide selected from among the oxides of titanium, vanadium, chromium, manganese, iron, cobalt, nickel, copper, zinc, cerium, tin, lead, wolfram, and mixtures thereof, and a catalyst selected from among the transition metals, the inorganic and organic compounds of the transition metals and the complexes of the said transition metals, both by themselves as well as supported by inert materials, said mixture also containing at least one anhydrous salt selected from among those anhydrous salts which, on chemically reacting with water, form crystalline hydrated compounds which are stable at least up to a temperature of 90° C.

Also, in accordance with the present invention, there is provided a hydrogen-absorbing mixture for optical fiber telecommunication cables, characterized by the fact of comprising at least one oxide selected from among the oxides of titanium, vanadium, chromium, manganese, iron, cobalt, nickel, copper, zinc, cerium, tin, lead, wolfram and mixtures thereof, and of a catalyst selected from among the transition metals, the inorganic and organic compounds of the transition metals, the complexes of said transition metals, both by themselves as well as supported by inert materials, said mixture also containing at least one anhydrous salt selected from among anhydrous salts which, on chemically reacting with water, form crystalline hydrated compounds which are stable at least up to temperatures of 90° C.

Other objects and advantages of the present invention will be apparent from the following detailed description of the presently preferred embodiments thereof, which description should be considered in conjunction with the accompanying drawings in which.

Figure 1:
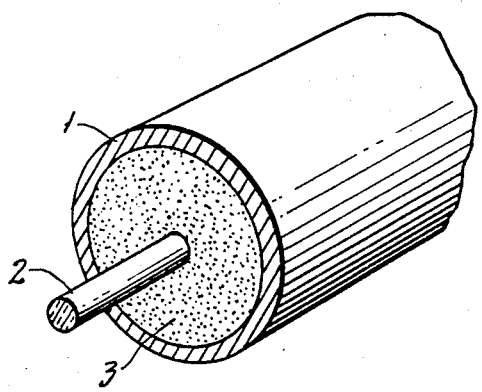
FIG. 1 is a perspective view of a length of cable incorporating the invention.

The optical fiber cables comprise an optical core, in which there is contained at least one optical fiber, which core is within a sheath. Around the sheath, there can be conventional protecting means, such as armorings of helically wound wires or the like.

The structure of the optical core can assume different configurations, thereby providing a plurality of different types of optical fiber cables.

The cables of the present invention can include an optical core of any structure and can be provided with any desired type of reinforcement, or protection around the sheath as long as said cables incorporate the hydrogen-absorbing mixture, such mixture being capable of blocking, in an irreversible manner, every trace of hydrogen, and notwithstanding the way in which said compound is incorporated into a cable.

The hydrogen-absorbing mixture of the invention comprises the following three fundamental components.

A basic component of the mixture is constituted by at least one oxide selected from among the oxides of titanium, vanadium, chromium, manganese, iron, cobalt, nickel, copper, zinc, cerium, tin, lead, and wolfram.

Another basic component of the mixture is constituted by a catalyst selected from among the transition metals, the inorganic and organic compounds of the transition metals, the complexes of the transition metals, either by themselves or supported by inert materials, such as, animal, or vegetable carbon powder, or the like.

Examples of catalysts are palladium powder, palladium supported by barium sulphate, palladium acetate, palladium acetylacetonate, palladium hydroxide, palladium chloride, chloroplatinic acid, and copper chromite.

The amount of catalyst which can be used with the basic oxide component can vary over a relatively wide range, but the amount used affects substantially only the speed of reaction of hydrogen with the molybdenum trioxide. Thus, with small effective amounts of the catalyst, the speed of reaction is relatively low, and as the amount of catalyst is increased, the speed of reaction increases. Since the speed of reaction is not significant, at least when the amount of hydrogen involved is small, small amounts of catalyst can be used. The preferred range is from $1 \times 10^{-3}$ to 3 parts by weight of the catalyst per 100 parts by weight of the basic oxide component, but smaller or greater amounts can be used. In all cases, the amount of catalyst will be less than the amount of basic oxide component.

The third basic component of the mixture is at least one anhydrous salt selected from among those which, on reacting chemically with water, form crystalline hydrated compounds which are stable at least up to a temperature of 90° C.

Examples of anhydrous salts of the above-defined type are anhydrous calcium sulfate, anhydrous calcium chloride, anhydrous sodium sulfate, anhydrous copper sulfate and mixtures thereof.

The amount of anhydrous salt which can be used in the mixture can vary over a relatively wide range, but preferably, is in the range from 10 to 200 parts by weight with respect to 100 parts by weight of the basic oxide component.

Preferably, each of the basic components is in powder form and has a particle size in the range from 1 to 120 microns.

As previously stated, the optical fiber cables of the invention are not subjected to any limitations as far as the manner in which the hydrogen-absorbing mixture is incorporated into them.

For example, the mixture can be incorporated just as it is, or else, it can be dispersed in a cable filler, for example, in a silicone grease. As an alternative, or in addition, the mixture can be made to cover a cable component, and it is fixed to the surface of a cable component by an adhesive, or it can form one of the components of the polymeric compound out of which a component of the cable is formed.

The amount of the mixture of the oxide, catalyst and anhydrous salt to be included per unit length of cable depends upon the expected amount of hydrogen to be absorbed and hence, the amount of the mixture per unit length of cable can vary over a relatively wide range. Generally, the amount of the mixture per unit length of cable can be calculated or determined empirically and should be present in an amount sufficient to absorb the amount of hydrogen to which the cable is to be exposed. The amount of the mixture need not exceed 20 gm. per linear meter of cable, and a representative amount of the mixture per linear meter of cable is 0.3 gm. When the amount of hydrogen to which the cable is to be subjected for the life of the cable is in the range from a fraction of normal $cm^3$ up to 5 normal $cm^3$ per linear meter of cable, the preferred range of the mixture per linear meter of cable is from about 0.0025 to about 20 gm.

The Figures of the drawings illustrate some forms of cables constructed according to the invention.

The cable shown in FIG. 1 has a metal or plastic sheath 1 which surrounds one optical fiber 2, and all the space existing between the sheath 1 and the fiber 2 is filled up with the mixture 3 according to the invention, or else, with such mixture dispersed in a filler, for example, a silicone grease into which said mixture is dispersed.

Figure 2:
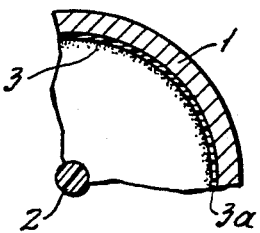
FIGS. 2 and 3 are fragmentary cross-sections of modifications of the embodiment shown in FIG. 1.

According to an alternative embodiment of the cable shown in FIG. 2, the mixture 3 just covers the inner surface of the sheath 1 and is attached to it by an adhesive 3a constituted, for example, by a polyvinyl ether.

Figure 3:
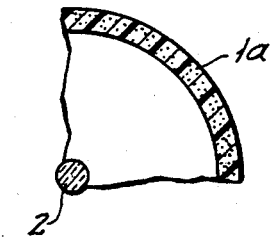

In another embodiment of the cable shown in FIG. 3, the sheath 1a is made of a plastic compound in which the mixture 3 is incorporated as a component of the plastic compound.

Figure 4:
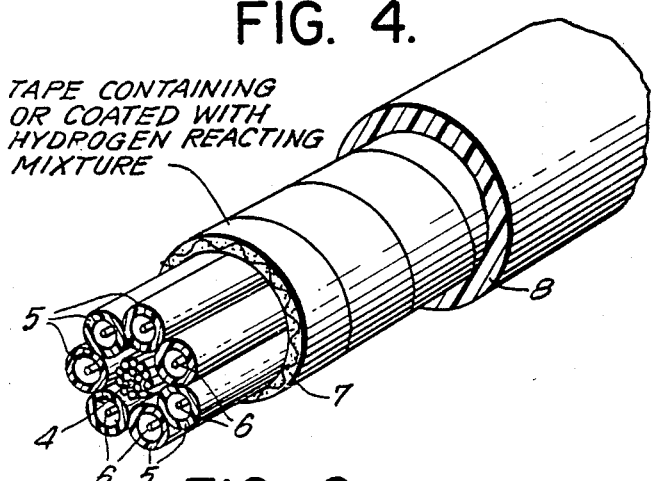
FIG. 4 is a perspective view of a further embodiment of a cable of the invention.

In FIG. 4, there is shown a further embodiment of a cable according to the invention. The cable of FIG. 4 has the following structure.

In the cable's radially innermost position, there is present a rope 4, or the like, around which there are disposed a plurality of small plastic tubes 5 inside which the optical fibers 6 are loosely housed. Around the entire group of the tubes 5, there is wound a tape 7 which incorporates the mixture according to the invention. Then, a sheath 8 surrounds the windings of the tape 7.

Figure 5:
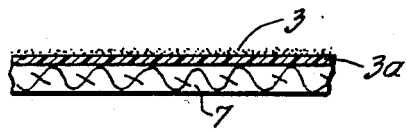
FIG. 5 is a fragmentary cross-section of a modified form of the tape which may be used in the embodiment shown in FIG. 4.

The tape 7 can be made out of plastic, of textile fabric, or of paper, and the manner by which the mixture is incorporated into the tape can be any desired manner. For example, the mixture 3 can cover at least one face of the tape 7, being attached to it by an adhesive 3a, such as polyvinyl-ether, as shown in FIG. 5, or alternatively, the mixture 3 can be embedded in a plastic film contacting one face of the tape 7.

Also, if the tape 7 is made from a plastic compound, said mixture 3 can be a component of the plastic compound.

In case the tape 7 should be made out of a textile fabric, and more generally, of a fibrous material, for example, a woven or a non-woven fabric, or else, if said tape is made of paper, the tape can be impregnated with the mixture with the result that the mixture is disposed within the meshes of the netting of the threads or fibers which form said tape.

As an alternative, or in addition, in the cable of FIG. 4, the mixture 3 can, according to the invention, by itself fill the tubes 5 where the optical fibers are housed, or else, it can constitute the additive of a filler, for example, a silicone grease which fills the said tubes 5.

According to another alternative embodiment, in the cable of FIG. 4, the mixture can, by itself, fill up the spaces existing between the windings of the tape 7, the tubes 5 and the rope 4, or it can constitute an additive of a filler, such as the previously mentioned one, which fills up said spaces.

As a further alternative in the cable of FIG. 4, when the sheath 8 is made out of a polymeric compound, the mixture can be incorporated into said sheath as a component of the compound out of which the sheath is formed as illustrated in FIG. 3.

Other alternative embodiments, for the cable of FIG. 4, include combinations of the described different ways which will introduce the mixture, according to the invention, into the cable.

Figure 6:
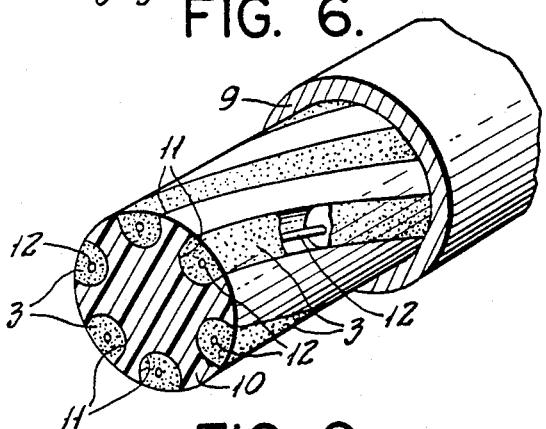
FIG. 6 is a perspective view of an alternative embodiment of a cable of the invention.

In FIG. 6, there is shown a further form of embodiment for a cable according to the invention.

As can be seen in FIG. 6, the cable has a sheath 9 made, for example, of a metallic material.

Inside sheath 9, there is enclosed a shaped body 10 made, for example, of a polymeric compound, which is provided on its outer surface with a plurality of helical grooves 11 inside which the optical fibers 12 are loosely housed. Said grooves 11 are filled up with the mixture 3, according to the invention, or else, with a filler containing the mixture, for example, a silicone grease or the like, into which the mixture is incorporated.

Figure 7:
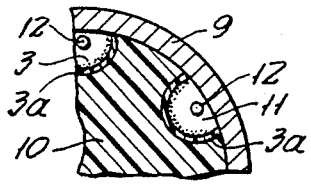
FIGS. 7 and 8 are fragmentary cross-sections of modifications of the embodiment shown in FIG. 6.

According to an alternative embodiment of the cable shown in FIG. 6, which is shown in FIG. 7, the mixture 3 covers the surface of the grooves 11 and is attached to the walls thereof by means of an adhesive, for example, a polyvinyl-ether.

Figure 8:
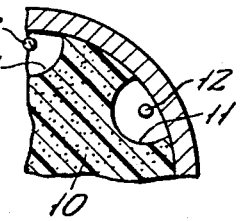

In another alternative embodiment of the cable in FIG. 6, shown in FIG. 8, the mixture according to the invention, is incorporated into the shaped body 10, thereby constituting a component of the polymeric compound forming the body 10.

Moreover, in the case where the sheath 9 is made of a polymeric compound, there can be added to it, as a component, a mixture according to the invention as illustrated in FIG. 3.

Figure 9:
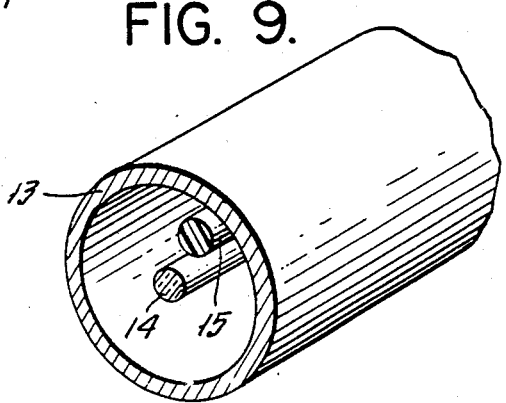
FIG. 9 is a perspective view of an alternative embodiment of a cable of the invention.

In FIG. 9, there is shown a further alternative embodiment of the cable according to the invention. The cable of FIG. 9 has a sheath 13 of metal, or of a polymeric compound, which encloses an optical fiber 14 and an elongated element 15, for example, a rod made out of a polymeric compound, which lies adjacent to the optical fiber and which incorporates, in any way, a mixture according to the invention.

In particular, the mixture, according to the invention, is incorporated into the rod or elongated element 15, as a component of the polymeric compound from which it is formed.

Figure 10:
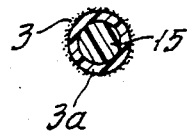
FIG. 10 is a cross-section of the rod 15 shown in FIG. 9 modified to including a coating of the mixture of the invention.

As an alternative, or in addition, the mixture, according to the invention, covers the outer surface of the element 15 as shown in FIG. 10 and the mixture is attached to it by means of an adhesive 3a, for example, a polyvinyl-ether.

Figure 11:
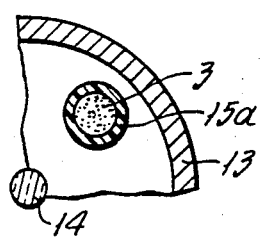
FIG. 11 is a fragmentary cross-section of a modification of the embodiment shown in FIG. 10.

According to an alternative embodiment of the cable shown in FIG. 9, and which is shown in FIG. 11, the elongated element 15a is constituted by a tube made from a polymer that is highly permeable to hydrogen, such as a low density polyethylene or a silicone rubber, is filled with the mixture 3 of the invention, or with a filler containing the mixture, for example, a silicone grease in which the mixture in question is dispersed.

For the purpose of determining the capacity of the mixtures of the invention to obtain an irreversible chemical reaction to the hydrogen, experimental tests were carried out with samples of such mixtures and also with samples of the materials for forming the optical fiber cable components, according to the invention, in which these mixtures are incorporated.

The samples which were chosen for the tests are those listed hereinafter, and the selection of said samples was accomplished according to the following criteria.

For the samples of the mixtures, there were chosen those containing an oxide of at least one element, for each group of the periodic table, the previously described oxides of which constitute a basic component for the mixture of the invention.

For the samples of materials for the components of the optical fiber cables with the mixtures incorporated therewithin are all those based upon only one of the previously listed oxides for showing that a mixture according to the invention keeps, as a practical matter, its capacity for chemically absorbing hydrogen no matter in which manner it is incorporated into the material of a component of an optical fiber cable.

SAMPLE A

The sample is formed by 15 gr of a hydrogen-absorbing mixture, in powder form, having the following composition:

| | |
|---|---|
| Copper oxide (CuO) | 100 parts by weight |
| Palladium supported by barium sulfate with a 5% palladium content | 1 parts by weight |
| Anhydrous calcium sulfate | 10 parts by weight |

SAMPLE B

The sample is formed by 15 gr of a hydrogen-absorbing mixture, in powder form, having the following composition:

| | |
|---|---|
| Zinc oxide (ZnO) | 100 parts by weight |
| Palladium supported by barium sulfate having a 5% palladium content | 1 parts by weight |
| Anhydrous calcium sulfate | 10 parts by weight |

SAMPLE C

The sample is formed by 15 gr of a hydrogen-absorbing mixture, in powder form, having the following composition:

| | |
|---|---|
| Cerium oxide (CeO$_2$) | 100 parts by weight |
| Palladium chloride | 0.1 parts by weight |
| Anhydrous sodium sulfate | 10 parts by weight |

SAMPLE D

The sample is formed by 15 gr of a hydrogen-absorbing mixture, in powder form, having the following composition:

| | |
|---|---|
| Lead dioxide (PbO$_2$) | 100 parts by weight |
| Palladium chloride | 0.1 parts by weight |
| Anhydrous sodium sulfate | 10 parts by weight |

SAMPLE E

The sample is formed by 15 gr of a hydrogen-absorbing mixture, in powder form, having the following composition:

| | |
|---|---|
| Vanadium pentoxide (V$_2$O$_5$) | 100 parts by weight |
| Palladium supported by alumina having a 5% palladium content | 1 parts by weight |
| Anhydrous calcium chloride | 10 parts by weight |

SAMPLE F

The sample is formed by 15 gr of a hydrogen-absorbing mixture, in powder form, having the following composition:

| | |
|---|---|
| Wolfram oxide (WO$_3$) | 100 parts by weight |
| Palladium supported by alumina having a 5% palladium content | 1 parts by weight |
| Anhydrous calcium chloride | 10 parts by weight |

SAMPLE G

The sample is formed by 15 gr of a hydrogen-absorbing mixture, in powder form, having the following composition:

| | |
|---|---|
| Manganese oxide (Mn$_2$O$_7$) | 100 parts by weight |
| Palladium powder | 0.2 parts by weight |
| Anhydrous calcium sulfate | 10 parts by weight |

SAMPLE H

The sample is formed by 15 gr of a hydrogen-absorbing mixture, in powder form, having the following composition:

| | |
|---|---|
| Nickel oxide (NiO) | 100 parts by weight |
| Palladium supported by barium sulfate having a 5% palladium content | 1 parts by weight |
| Anhydrous calcium sulfate | 10 parts by weight |

SAMPLE I

The sample is formed by 15 gr of a filler having the following composition:

| | |
|---|---|
| Silicone grease | 100 parts by weight |
| Vanadium pentoxide (V$_2$O$_5$) | 10 parts by weight |
| Palladium supported by barium sulfate having a 5% palladium content | 0.1 parts by weight |
| Anhydrous sodium sulfate | 10 parts by weight |

The content of the hydrogen-absorbing mixture, present in the sample under examination, is 1.6 gr.

SAMPLE L

The sample is formed by a square-shaped stamped plate, having 10 cm sides and a thickness of 1 mm and made of a compound having the following recipe:

| | |
|---|---|
| Silicone rubber | 100 parts by weight |
| Vanadium pentoxide (V$_2$O$_5$) | 50 parts by weight |
| Palladium supported by barium sulfate having a 5% palladium content | 0.5 parts by weight |
| Anhydrous sodium sulfate | 5 parts by weight |

The plate has a 1.1 gr content of the hydrogen-absorbing mixture.

SAMPLE M

The sample is formed by a rectangular-shaped polyethylene plate, having sides of 10 and 2 cm and a thickness of 1 mm, with one of its faces covered by 0.2 gr of a hydrogen-absorbing mixture having the composition of SAMPLE E.

The hydrogen-absorbing mixture that is constituted by a powder, is attached by an adhesive film, made of a polyvinylether, which covers one face of the polyethylene plate.

SAMPLE N

The sample is formed by a woven cotton fabric sheet, having a square-shaped form with sides of 10 cm and impregnated with 1 gr of the following compound:

| | |
|---|---|
| Silicone rubber | 100 parts by weight |
| Vanadium pentoxide (V$_2$O$_5$) | 50 parts by weight |
| Palladium supported by barium sulfate having a 5% palladium content | 0.5 parts by weight |
| Anhydrous sodium sulfate | 5 parts by weight |

The content of the hydrogen-absorbing mixture in this sample is 0.5 gr.

SAMPLE O

The sample is formed by a square sheet of cellulose paper, having sides of 10 cm, and incorporating 0.2 gr of the following mixture:

| | |
|---|---|
| Vanadium pentoxide ($V_2O_5$) | 100 parts by weight |
| Palladium supported by alumina having a 5% palladium content | 1 parts by weight |
| Anhydrous sodium sulfate | 10 parts by weight |

SAMPLE P

The sample is formed by a low density polyethylene tube, having sealed ends, with a wall thickness of 0.2 mm, a diameter of 2 mm, and a length of 1 m, which is completely filled with the mixture of SAMPLE E.

The content of the hydrogen-absorbing mixture in this sample, is 10 gr.

As previously stated, experimental tests were carried out on the above-described samples.

These experimental tests were carried out at a temperature of 20° C. with apparatus which comprised a glass bulb into which the sample to be examined was introduced.

Said glass bulb had a capacity of 165 cm$^3$ and had a small glass tube sealed thereto and which terminated in a two-way tap connected respectively to a vacuum pump and to a phial containing hydrogen.

At an intermediate portion of the tube, there was inserted a mercury gauge which served for indicating the pressure inside the glass bulb which was used for calculating the quantity of hydrogen present in the bulb.

It has been experimentally ascertained that all the previously described samples react chemically, but not in stoichiometric quantities, with the hydrogen.

Therefore, for each sample, the maximum quantity of hydrogen capable of being absorbed chemically, has been experimentally determined, and also, the time required by the sample for absorbing said maximum quantity of hydrogen has been determined. These experimental tests were carried out with the following procedures.

After having introduced a sample into the glass bulb, the latter was connected to the vacuum pump for obtaining barometric vacuum, the obtaining of such vacuum being verified with the mercury gauge.

At this point, the evacuation of the glass bulb was discontinued, and the glass bulb was put into communication with the phial containing hydrogen, in such a way as to introduce into it a predetermined quantity of hydrogen. Such quantity was measured on the basis of the partial pressure of the hydrogen, inside the glass bulb itself, which is at least equal to the stoichiometric quantity required for completely saturating the sample under examination.

The reduction in the quantity of hydrogen present in the glass bulb is then noted on the basis of the reduction in the hydrogen pressure, as measured with the mercury gauge. The minimum value of said pressure is noted, as well as the time taken (in hours) until the minimum pressure has been reached.

Through the means of calculations, there are then determined both, the maximum quantity of hydrogen absorbed for each sample, expressed in normal cm$^3$ for 1 gr of the sample, as well as the maximum quantity of hydrogen that can be absorbed by each sample expressed in normal cm$^3$ for 1 gr of the mixture contained in each sample.

The results which were obtained are set forth in the following TABLE:

| SAMPLE | MAXIMUM QUANTITY OF THE CHEMICALLY ABSORBABLE HYDROGEN PER 1 GR. OF SAMPLE | TIME REQUIRED FOR ABSORBING THE MAXIMUM QUANTITY OF HYDROGEN | MAX. QUAN. HYDROGEN ABSORBABLE PER GR. MIXTURE IN SAMPLES |
|---|---|---|---|
| A | 6.5 normal cm$^3$ | 100 | 6.5 normal cm$^3$ |
| B | 4.5 normal cm$^3$ | 100 | 4.5 normal cm$^3$ |
| C | 12.5 normal cm$^3$ | 150 | 12.5 normal cm$^3$ |
| D | 14.0 normal cm$^3$ | 90 | 14.0 normal cm$^3$ |
| E | 13.5 normal cm$^3$ | 40 | 13.5 normal cm$^3$ |
| F | 6.5 normal cm$^3$ | 200 | 6.5 normal cm$^3$ |
| G | 12.0 normal cm$^3$ | 90 | 12.0 normal cm$^3$ |
| H | 2.5 normal cm$^3$ | 120 | 2.5 normal cm$^3$ |
| I | 1.3 normal cm$^3$ | 130 | 13.5 normal cm$^3$ |
| L | 4.5 normal cm$^3$ | 720 | 13.5 normal cm$^3$ |
| M | 1.4 normal cm$^3$ | 80 | 13.5 normal cm$^3$ |
| N | 2.2 normal cm$^3$ | 70 | 13.5 normal cm$^3$ |
| O | 2.0 normal cm$^3$ | 50 | 13.5 normal cm$^3$ |
| P | 12.1 normal cm$^3$ | 240 | 13.5 normal cm$^3$ |

With successive experimental tests carried out with the apparatus described above, it was ascertained that when the quantity of the hydrogen initially introduced into the glass bulb, for the single samples under examination, is below the maximum absorbable value (given in the second column), and a complete disappearance of the hydrogen inside the glass bulb is verified, even when the quantity of hydrogen, initially introduced into this latter, consisted of only traces of hydrogen. The total elimination of the hydrogen in the glass bulb was ascertained through a gas-chromatography method, which permits for determining amounts of hydrogen as low as 10 parts per million.

As a result of the experimental tests which were carried out as previously described, the following conclusions can be reached.

The hydrogen-absorbent mixtures according to the invention are adapted to react chemically in an irreversible manner with the hydrogen thereby causing the total disappearance of the hydrogen.

Moreover, regardless of the manner in which the mixtures according to the invention are incorporated into the materials forming a component of an optical fiber cable, the capacity to react in an irreversible way with the hydrogen causing the total absorption of said hydrogen remains unaltered and within periods of time which are practically of the same order of magnitude as those obtainable with the mixture itself.

Even if the maximum quantities of hydrogen chemically absorbed in an irreversible manner, by the mixture in se and by the materials of the cable components which incorporate them, are below the stoichiometric quantities, said maximum quantities, which are set forth in the TABLE, are high when compared to the quantities of hydrogen which could be present in an optical fiber cable during its entire service life, and which are in the order of some normal cm$^3$ of hydrogen per meter of cable.

Hence, it is apparent that, with the mixtures according to the invention, it is possible to efficiently protect the optical fibers with respect to hydrogen and that optical fiber cables, according to the invention, are protected from the damage which hydrogen can cause to such fibers.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An optical fiber telecommunication cable comprising a sheath enclosing at least one optical fiber and comprising a hydrogen absorbing mixture, said mixture comprising at least one oxide selected from the group of oxides consisting of titanium, vanadium, chromium, manganese, iron, cobalt, nickel, copper, zinc, cerium, tin, lead and wolfram, at least one catalyst selected from the group consisting of the transition metals, the inorganic and the organic compounds of the transition metals and the complexes of the said transition metals and at least one anhydrous salt which, on chemically reacting with water, forms crystalline hydrated compounds which are stable at least up to a temperature of 90° C.

2. An optical fiber cable as set forth in claim 1 wherein said at least one anhydrous salt is selected from the group consisting of anhydrous calcium sulfate, anhydrous calcium chloride, anhydrous sodium sulfate and anhydrous copper sulfate.

3. An optical fiber cable as set forth in claim 1 wherein said at least one catalyst is selected from the group consisting of powders of palladium, palladium supported by barium sulfate, copper chromite, palladium acetate, palladium acetylacetonate, palladium hydroxide, palladium chloride and chloroplatinic acid.

4. An optical fiber cable as set forth in claim 1 wherein said mixture is intermediate said sheath and said optical fiber or fibers.

5. An optical fiber cable as set forth in claim 4 wherein said mixture further comprises a filling material.

6. An optical fiber cable as set forth in claim 1 wherein said mixture fills all otherwise empty spaces intermediate said sheath and said optical fiber or fibers.

7. An optical fiber cable as set forth in claim 1 wherein said mixture forms a layer on the inner surface of said sheath which is bonded to said inner surface by an adhesive.

8. An optical fiber cable as set forth in claim 1 wherein said sheath is made of a polymeric material having said mixture therein.

9. An optical fiber cable as set forth in claim 1 further comprising an elongate member within said sheath having a plurality of longitudinally extending grooves at its outer surface and wherein at least one optical fiber is loosely disposed in each groove.

10. An optical fiber cable as set forth in claim 9, wherein said mixture is in said grooves.

11. An optical fiber cable as set forth in claim 9, wherein said elongate member is made of polymeric material having said mixture therein.

12. An optical fiber cable as set forth in claim 1 wherein said optical fiber or fibers are surrounded by a tape including said mixture and within said sheath.

13. An optical fiber cable as set forth in claim 12 wherein said tape has a layer of said mixture on at least one surface thereof, said layer being bonded to said tape by an adhesive.

14. An optical fiber cable as set forth in claim 12 wherein said tape is made of a polymeric having said mixture therein.

15. An optical fiber cable as set forth in claim 12 wherein said tape is made of a fibrous material impregnated with said mixture.

16. An optical fiber cable as set forth in claim 1 further comprising an elongate member extending alongside said optical fiber or fibers and longitudinally within said sheath, said elongate member containing said mixture.

17. An optical fiber cable as set forth in claim 16 wherein said elongate member is a tube of polymeric material and wherein said tube has said mixture therewithin.

18. An optical fiber cable as set forth in claim 1 wherein the amount of the catalyst is in the range from $1\times10^{-3}$ to 3 parts by weight per 100 parts by weight of said oxide in the mixture.

19. An optical fiber cable as set forth in claim 18 wherein the amount of anhydrous salt is in the range from 10 to 200 parts by weight per 100 parts by weight of said oxide.

20. An optical fiber cable as set forth in claim 19 wherein the amount of said mixture per linear meter of cable is at least 0.0025 gm.

21. An optical fiber cable as set forth in claim 18 wherein the amount of said mixture per linear meter of cable is not greater than 20 gm.

22. An optical fiber cable as set forth in claim 1 wherein said oxide, said catalyst and said anhydrous salt are in powder form and have a particle size in the range from 1 to 120 microns.

23. A hydrogen mixture as set forth in claim 1 wherein said at least one catalyst is supported on at least one inert material.

24. A hydrogen absorbing mixture for optical fiber telecommunication cables comprising at least one oxide selected from the group consisting of the oxides of titanium, vanadium, chromium, manganese, iron, cobalt, nickel, copper, zinc, cerium, tin, lead and wolfram, at least one catalyst selected from the group consisting of the transition metals, the inorganic and the organic compounds of the transition metals and the complexes of said transition metals and at least one anhydrous salt which, on chemically reacting with water, forms crystalline hydrated compounds which are stable at least up to a temperature of 90° C.

25. A hydrogen absorbing mixture as set forth in claim 23 wherein said at least one anhydrous salt is selected from the group consisting of anhydrous calcium sulfate, anhydrous calcium chloride, anhydrous sodium sulfate and anhydrous copper sulfate.

26. A hydrogen absorbing mixture as set forth in claim 24 wherein said at least one catalyst is selected from the group consisting of palladium powder, palladium supported by barium sulfate, copper chromite, palladium acetate, palladium acetylacetonate, palladium hydroxide, palladium chloride, and chloroplatanic acid.

27. A hydrogen absorbing mixture as set forth in claim 24 wherein said at least one catalyst is supported on at least one inert material.

* * * * *

UNITED STATES PATENT AND TRADEMARK OFFICE
CERTIFICATE OF CORRECTION

PATENT NO. : 4,725,123

DATED : February 16, 1988

INVENTOR(S) : Anelli et al

It is certified that error appears in the above-identified patent and that said Letters Patent is hereby corrected as shown below:

Col. 12, line 56, change "23" to --24--.

Signed and Sealed this

Eleventh Day of October, 1988

Attest:

DONALD J. QUIGG

Attesting Officer

Commissioner of Patents and Trademarks